A. JOHNSON.
COOKER.
APPLICATION FILED APR. 22, 1918.
1,302,171.
Patented Apr. 29, 1919.
3 SHEETS—SHEET 1.
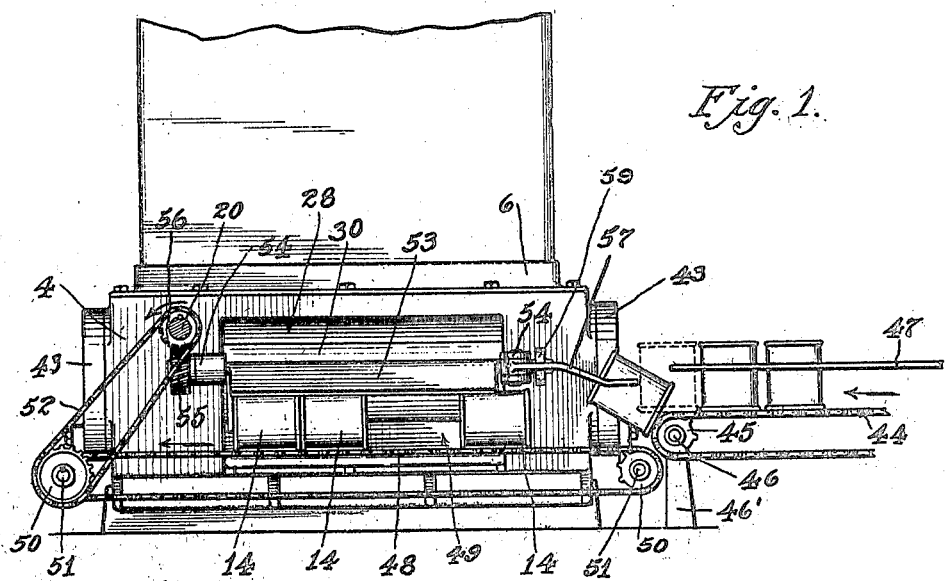
INVENTOR.
Axel Johnson
BY
ATTORNEYS

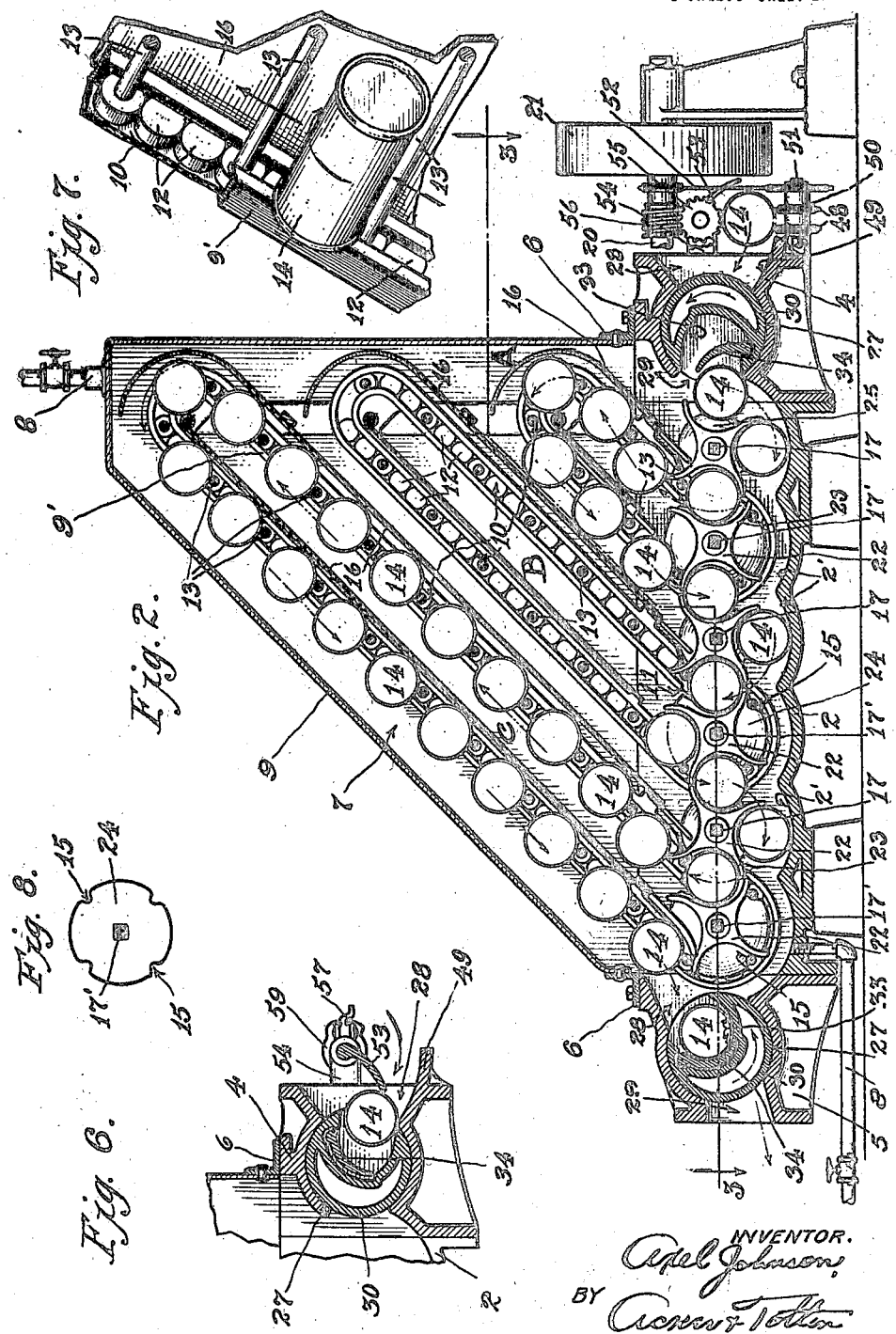

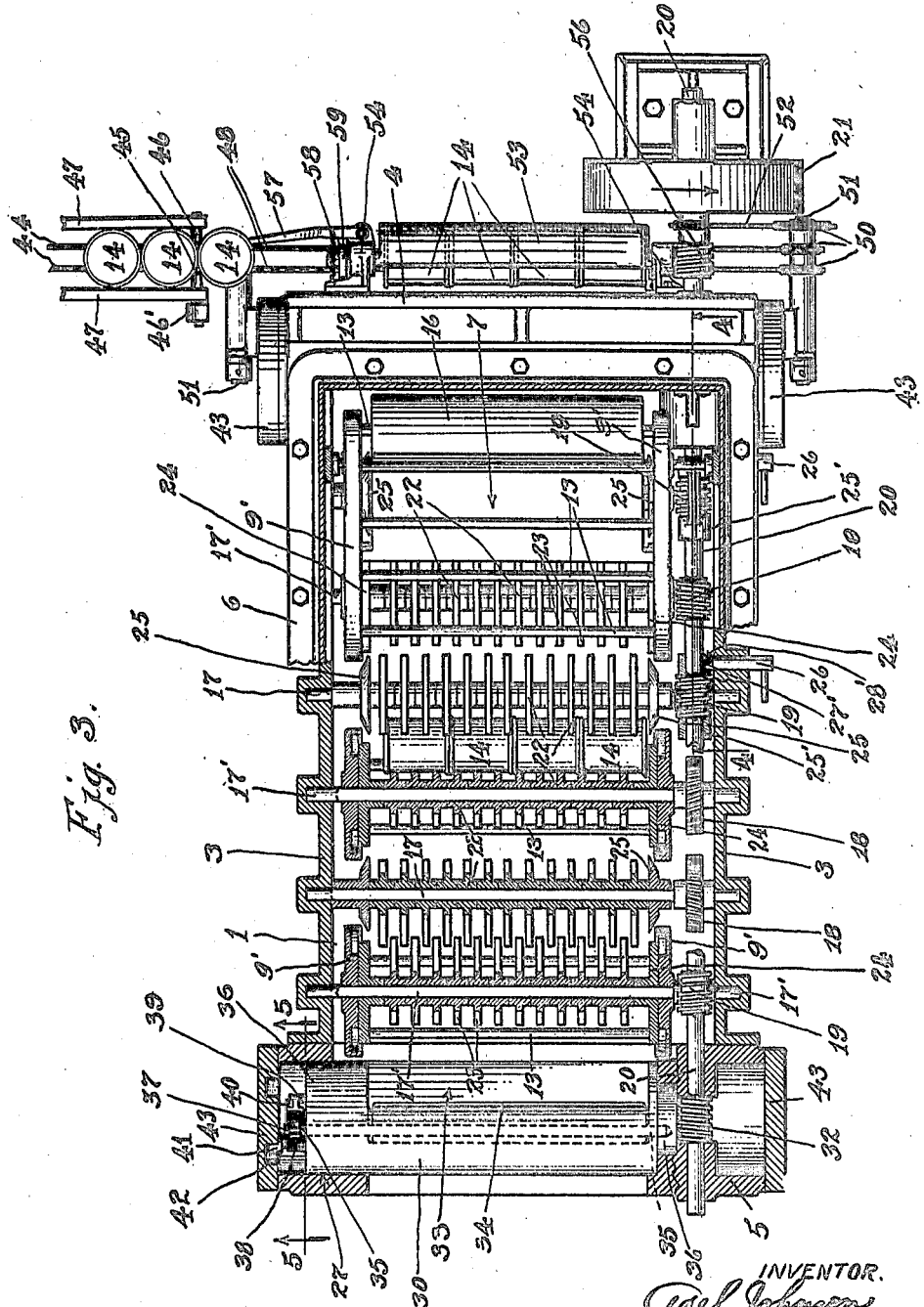

UNITED STATES PATENT OFFICE.

AXEL JOHNSON, OF OAKLAND, CALIFORNIA.

COOKER.

1,302,171.	Specification of Letters Patent.	Patented Apr. 29, 1919.

Application filed April 22, 1918. Serial No. 230,149.

*To all whom it may concern:*

Be it known that I, AXEL JOHNSON, a citizen of the United States, residing at Oakland, in the county of Alameda and State of California, have invented certain new and useful Improvements in Cookers, of which the following is a specification.

The present invention relates to an improved form of cooker designed particularly for the cooking of food products in suitable closed containers.

The invention has for its principal objects to provide a closed chamber having a plurality of independent runways therein, and coöperating with which are independent devices or directing gates capable of directing the receptacles within the chamber relative to the runways to control the movement of the receptacles through the apparatus to regulate the cook of the contents thereof; one provided with a novel form of runway wherein the movement of the receptacles in one direction assists the movement of the same in another direction; one provided with an improved means for feeding the receptacles into the apparatus and discharging the same therefrom in timed relation; and one wherein the receptacles as conveyed are rotated, maintaining the material therein agitated and insuring a uniform cook of the contents of the said receptacles.

With the above mentioned and other objects in view, the invention consists in the novel construction and combination of parts hereinafter described, illustrated in the accompanying drawings and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference should be had to the accompanying sheets of drawings, wherein, Figure 1 is a view in end elevation of the preferred embodiment of my invention, illustrating the mechanism for intermittently feeding the receptacles into the chamber.

Fig. 2 is a longitudinal sectional view of my improved apparatus illustrating more particularly the runways, the receptacle feed and discharge valves and the directing devices within the apparatus for directing the travel of the receptacles relative to the runways.

Fig. 3 is a transverse sectional view taken on the line 3—3 of Fig. 2, viewed in the direction of the arrows.

Fig. 4 is a sectional view of the operating means for the receptacle directing gates, taken on the line 4—4 of Fig. 3.

Fig. 5 is a view in detail of the mechanism for controlling the operating of the gates of the feed discharge valves, the same being taken on the line 5—5 of Fig. 3.

Fig. 6 is a view in detail of the feed valve and the means for delivering the receptacles into the recess thereof.

Fig. 7 is a view in perspective of a portion of one of the conveyers.

Fig. 8 is a view in end elevation of one of the disks or sprockets for operating the conveyer flights.

Referring more particularly to the several views of the drawings, wherein like characters of reference designate corresponding parts, 1, indicates a suitable open top base, having a bottom wall 2, side walls 3 and end end walls 4 and 5, the inner surface of said bottom wall being provided with arcuate depressions 2' extending transversely thereof. To the upper edge of said side and end walls is secured the angle member 6 attached to the lower edge of a chamber 7. The chamber is preferably rectangular in horizontal cross-section and triangular in vertical cross-section as in Fig. 2 of the drawings, and the same is supplied with a cooking medium preferably steam under pressure through the valve controlled inlet 8, and the steam pressure and condensation may be released through the valve controlled outlet 8' communicating with the interior of the chamber through the bottom wall 2 of the base 1.

The runways and conveyers for transporting the receptacles within the chamber are constructed in the following manner:

Extending preferably parallel with the inclined wall 9 of the chamber 7, and arranged adjacent the inner face of the opposite side walls of the said chamber are the conveyer tracks 9', increasing in length from the feed to the discharge end of the casing, as in Fig. 2 of the drawings, providing a set of three independent tracks of different lengths. The tracks are arranged in pairs opposite each other and are continuous at their upper and lower ends, providing a pair of flights for each set of tracks and said tracks are formed in adjacent faces, with the flanged grooves 10, the said flanges being interrupted as at 11, at the lower ends of said tracks providing a recess for the reception of a conveyer supporting plate hereinafter described.

The conveyers associated with each track, Figs. 2 and 7 of the drawings, consist preferably of a plurality of independent disks 12, longitudinally movable within the flanged grooves 10 of the tracks, and certain disks in opposite tracks, preferably every fourth one, depending on the diameter of the containers employed, are connected by the horizontally disposed container supporting rods 13 and on which rest the containers 14 during the conveying of the same longitudinaly of said tracks. By constructing the conveyers as described a rolling motion is imparted to the receptacles during the conveying thereof, and the take up or adjustment of the same when the disks thereof become warm is overcome, as the disks are at all times in contact at the lower end of the downward flight of any given conveyer enabling the rods 13 to be received within the notches 15 of the conveyer operating plates hereinafter set forth.

Extending transversely of the chamber below each flight of the respective runways are the supporting plates 16, Figs. 2 and 7, and on which rest the receptacle during the movement thereof by said conveyers.

The mechanism for operating the conveyers and the gates for directing the receptacles relative thereto, includes the transversely disposed shafts 17 and 17' rotatably mounted at the opposite ends in bearings in the side walls 3 of the base 1. The shafts 17 are disposed to lie one between the lower ends of the said runways and the shafts 17' between the continuous lower end of the tracks forming the runway. Each of said shafts is squared and carries a pinion gear 18, which intermeshes with a worm 19 on a shaft 20 rotatably supported in suitable bearings in the base 1, said shaft being driven in the direction of the arrow, Fig. 3 by power imparted to the band wheel 21. The worms 19, are so pitched as to drive the shafts 17 and 17' in the direction of the arrows, Fig. 2 of the drawings. The shafts 17 and 17' intermediate of their ends are square in cross-section and supported thereon to rotate therewith are the receptacle directing gates in the form of star wheels 22, the arms thereof preferably four in number, extend radially from the center of each and are preferably curved in the direction of the rotation of said shaft, said star wheels on adjacent shafts being preferably arranged in staggered relation, to permit the overlapping and clearance of the arms 23 when corresponding arms of the wheels of adjacent shafts simultaneously assume substantially horizontal position.

The shafs 17' carry at their opposite ends in contact with the inner face of the lower connected ends of the track 9', the conveyer operating plates 24, which rotate therewith, and which are formed as heretofore stated with the peripheral notches 15 in which are received the supporting rods or members 13, Fig. 8 of the drawings.

Mounted to rotate with the shafts 17 and positioned at the opposite ends thereof in slight spaced relation to the tracks 9' are the retaining plates 25, said plates 25 and said plates 24 on the shaft 17' limiting the longitudinal movement of the receptacles relatively to the star wheels or gates, thus properly positioning the receptacles for engagement by the rods or members 13. To insure the proper positioning of the receptacles relatively to the rods and the removal of the same therefrom, the arms 23 of the gates or star wheels are arranged to lie slightly in advance of the notches 15 of the plate 24 associated with the shafts mounting said wheels.

The worms 19 and the shaft 20 coöperating with the pinion gears 18 and the shafts 17, are independently movable longitudinally of the shaft 20, and each is mounted within a yoke 25' capable of adjustment through the shifter rod 26 axially rotatable within an opening of the side wall 3 of the base 1, and each carrying an eccentric head 27', receivable in a slot or opening 28' in one of said yokes 25'. The axial rotation of the rods 26, shifts the worms 19 associated therewith longitudinally of their supporting shaft, causing a slight rotation of the coöperating shaft 17, to either position the ends of the curved arms 23 of the gates or star wheels 22 carried thereby in advance or in rear of the coöperating arms of an adjacent wheel or gate to control the direction of travel of the receptacles through the apparatus.

Thus it will be apparent from Fig. 2 of the drawings, that the star wheels or directing gates on the first shaft 17 are positioned with the ends of the arms thereof in advance of the arms of the wheels or gates on the succeeding shaft 17' thereby directing the receptacles to travel longitudinally of the first runway A. As discharged from the first runway A the receptacles are engaged by the arms of the directing gate on the second shaft 17 and are elevated thereby from the depression 2' in the bottom wall 2, upwardly to the lower feed end of the runway B. Owing to the arms 23 of the directing gate associated with said shaft 17' lying slightly in rear of the corresponding arms of the directing gate on the next succeeding shaft 17, the receptacles are engaged by the arms 23 of said star wheel associated with the lower end of the runway B and are carried thereby without the path of the upwardly moving flight of the conveyer in said runway to a point within the path of the downwardly moving flight of said conveyer, and are thence deposited onto a succeeding recess in the bottom wall 2 to be moved by the directing gate arms on the next succeeding shaft 17. It will be apparent that the direction of movement of the receptacles from one runway to another is controlled solely by the position of the arms of the directing gates 22 on the shafts 17, relatively to the arms of the wheels upon the next succeeding shaft. The arms 23 first arriving at a horizontal position support the full weight of the receptacles and control the direction of travel of the same through the apparatus.

The end walls 4 and 5 are provided with elongated cylindrical bores 27, formed at opposite sides with the receptacle inlet openings 28 and the receptacle outlet passages 29. Rotatably mounted within the bores 27, are the cylindrical feed and discharge valves 30 each carrying at one end a pinion 31 intermeshing each with a worm 32 on the shaft 20, said valves adapted for operation in timed relation with the rotation of the shafts 17 and 17′, said valves making a complete revolution on each one-quarter revolution of the directing gates thereby maintaining the pockets of said gates filled at all times and the cooker operating at its full capacity.

The construction of both of said valves being the same, a description of one is thought sufficient.

The valves 30, are each provided in one face with a receptacle receiving depression 33, and positioned within each of said depressions is a swinging gate 34, provided at opposite ends with trunnions 35 fulcrumed in the end walls 36 of said valves, as in Fig. 3 of the drawings. The gates 34 are adapted to lie against the inner wall of their coöperating chambers when the chambers register with the inlet openings 28, and are adapted to be positively operated to expel the receptacles therefrom on the registry of the chambers with the outlet openings 29 and to carry out this operation the following mechanism is employed.

To one of the trunnions 35 is secured a pinion gear 37 intermeshing with a lug 38 on the free end of an arm 39, said arm being fulcrumed at one end on a member 40, attached to the valve end, Fig. 5 of the drawings. The arm 39 adjacent its fulcrum point is provided with a lateral extension carrying a roller 41 operating in a cam groove 42 in a plate 43, closing one end of the opening through which the valve is inserted into its chamber, thus a positive operation is imparted to the gate in each valve during the rotation of the same.

The receptacles are delivered to the inlet end of the apparatus in timed relation by the following mechanism illustrated in Figs. 1, 2 and 3 of the drawings. A suitable endless feed conveyer 44, operates on a sprocket 45 supported on a shaft 46, carried upon a suitable frame 46′ and the same is driven in the direction of the arrow by power supplied from any suitable source. The receptacles rest on the end of the said conveyer and pass between the guide rails 47, extending longitudinally of each side thereof. A suitable receptacle positioning conveyer of the endless type, and preferably formed of the spaced chains 48, extends transversely of the feed end of the apparatus in a plane slightly below the end of the conveyer 44 and at the front lower edge of the inclined surface 49, leading to the opening 28, said chains operating over sprockets 50, supported on horizontally disposed shafts 51, carried by the plates 43. A drive connection 52 extends from the shaft 20 to one of the shafts 51, operating said positioning conveyer in the direction of the arrow, Fig. 1 of the drawings. Opposite the inlet opening 28 of the feed end of the apparatus, and arranged above the receptacle positioning conveyer, is a feed plate 53 fulcrumed at its opposite ends in brackets 54, said plate being adapted to revolve on a horizontal axis and to engage the receptacles on the positioning conveyer 48 to roll the same therefrom and upwardly over said inclined surface 49, into the depression 33 in the feed valve. The plate carries on one of its trunnions the pinion gear 55 intermeshing with a worm 56 on the shaft 20 and through which power is imparted to the plate for operating the same. To insure the intermittent feed at the correct time of the receptacles from the receptacle feed conveyer to the positioning conveyer, the vertically disposed receptacles on the conveyer 44 are held from discharging from the end thereof, by a suitable drop arm 57, fulcrumed to one of the brackets 54, with its free end normally held within the path of the receptacles on the conveyer 44, by a spring 58. A cam 59 carried on one of the trunnions of the feed plates 53, is adapted on each complete revolution of said plate to engage said trip arm and remove the end thereof from contact with the endmost receptacle of the line of receptacles on the conveyer 44, permitting the feed of the receptacles on the conveyer 44 to the conveyer 48 during such time as the free end of said arm is removed from within the path of movement thereof.

The apparatus being assembled as in the drawings, the same operates in the following manner on the supplying of receptacles to the moving conveyer 44 and the rotating of the power wheel 21 in the direction of the arrow, Fig. 3 of the drawings, by suitable power applied thereto.

On the movement of the plate 53 to a position substantially as in Fig. 6 the cam 59 on the trunnion thereof engages the arm 57 and removes the end thereof from the foremost receptacle on the continuously moving conveyer 44 permitting the receptacles to fall or tip from the end of the conveyer 44 by the movement thereof onto the conveyer 48 and during such transfer the receptacles are tilted from a vertical position and assume a horizontal position on said conveyer 48, as in Fig. 1 of the drawings.

After the required number of receptacles are received on the conveyer 48 in the apparatus illustrated, four being the maximum, the feed of the receptacle is interrupted and said line of receptacles is engaged by the feed plate 53 and they are rolled thereby as a unit upwardly on the surface 49, Fig. 6 of the drawings, and are delivered into the depression 33 of the rotating receiving valve 30, which at this time has arrived at the position as in Fig. 6 of the drawings. The valve during its rotation prevents the escape of steam under pressure from within the chamber, and on the completion of a one-half rotation thereof, the gate 34 therein, is positively operated to discharge the receptacles from the depression 33 into the interior of the chamber. The receptacles thus fed into the chamber are engaged by the arms 23 of the gate on the first shaft 17 and are carried thereby within the path of the upwardly moving flight of the conveyer A, they being engaged by the rods 13 of the upwardly moving flight of said conveyer and conveyed longitudinally of the tracks thereof, to a point at the discharge end thereof where they are engaged by the arms 23 of the gate on the second shaft 17. This second shaft 17 having been adjusted to position the arms 23 of the gate thereof to drop slightly below the coöperating arms of the gate on the next succeeding shaft 17 as their arms assume a horizontal position, the weight of the receptacles as lifted by the upwardly moving arms of said gates is borne by the arms of the gate on the shaft 17′ and during the rotation of the shaft supporting said gate, are carried from beneath the path of operation of the upward flight of the conveyer B. The receptacles are then positioned due to the movement of said last gate to be engaged by the arms 23 of the gate on the third shaft 17′, and are moved thereby into engagement with the rods 13 of the upwardly moving flight of the conveyer C as said arms lie in advance of the arms on the next succeeding shaft 17′, and consequently support the entire weight of the receptacles and carry the same within the path of the upwardly moving flight of said conveyer C. On arriving at the lower end of the downwardly moving flight of the conveyer C after having traveled the length thereof the receptacles are deposited into the depression 33 of the discharge valve, which is rotated and the gate thereof is operated to discharge the receptacles from the depression 33. During the passage of the receptacles through the chamber the same are continuously rotated to maintain the contents thereof agitated to insure a uniform cook thereof and the construction of the feed and discharge valves is such as to prevent the escape of steam from the receptacle during the feeding or discharging of the containers therefrom.

The position of the gates on the adjustable shafts 17 controls the travel of the receptacles through the apparatus and consequently regulate the cook thereof as by the adjustment of said gates the receptacles may be directed to travel the full length of the conveyers A, B and C, or any of said conveyers, or may be conveyed directly through the apparatus without movement longitudinally of any of said conveyers.

Having thus described my invention what I claim is:

1. A cooker including a closed cooking chamber provided with valve controlled receptacle inlet and discharge openings, a plurality of independent endless upwardly inclined conveyers within said chamber and increasing in length toward the chamber discharge end, and a plurality of independent directing gates within said chamber and one associated with each conveyer for directing the receptacles delivered into said chamber relative to said conveyers to control the cook of the contents thereof.

2. A cooker including a closed cooking chamber provided with valve controlled receptacle inlet and discharge openings, a plurality of independent upwardly inclined conveyers within said chamber and each of a different length, and a receptacle directing gate associated with each conveyer for directing the receptacles delivered into said chamber relatively to said conveyers to control the cook of the contents thereof.

3. A cooker including a closed cooking chamber provided with valve controlled receptacle inlet and discharge openings, an upwardly inclined conveyer within said chamber, a rotatable controlling gate associated with said conveyer, a rotatable gate positioned in advance of said first mentioned gate and capable of adjustment relatively thereto to control the direction of movement of the receptacles when moved within the field of said first mentioned gate and said conveyer.

4. A cooker including a closed cooking chamber provided with valve controlled receptacle inlet and discharge openings, a pair of oppositely disposed channeled endless track-ways upwardly inclined within said chamber, an endless conveyer supported by said track-ways including a plurality of independent circular disks within the channels of said track-ways, a plurality of receptacle supporting bars connecting corresponding disks of opposite track-ways, a receptacle supporting plate positioned below the underside of each flight of said conveyer, means for moving said conveyer longitudinally of said track-ways, and means for feeding receptacles to the upwardly moving flight of said conveyer whereby the receptacles are supported by said rods and in contact with said plates during the conveying thereof.

5. A cooker including a closed cooking chamber provided with valve controlled receptacle inlet and discharge openings, means within the chamber for conveying the receptacles therethrough, means for feeding receptacles to the inlet opening of said chamber including an endless conveyer on which cylindrical receptacles are deposited in a horizontal position, an endless delivery conveyer arranged in a plane slightly above said feeding conveyer and with its discharge end above the receiving end of said feeding conveyer, said delivery conveyer adapted for conveying vertically disposed receptacles to said feeding conveyer, whereby the vertically disposed receptacles leaving the discharge end of said delivery conveyer topple to a horizontal position onto said feeding conveyer, a rotatable plate coöperating with said feeding conveyer for engaging the receptacles positioned thereon for rolling the same from the conveyer into said inlet opening and means operated by the movement of said plate for controlling the supplying of receptacles from said delivery conveyer to said feeding conveyer.

6. A cooker including a closed chamber provided with receptacle inlet and discharge openings, means within said chamber for conveying the receptacles therethrough, a controlling valve rotatable on a horizontal axis and positioned one within each of said openings, each of said valves comprising a cylindrical body formed with a receptacle receiving depression within its surface adapted on the rotation of said body to register alternately with the atmosphere and with the interior of said chamber, a gate within each of said depressions and fulcrumed at one edge therein to permit the free edge thereof to swing within said depression to discharge the receptacles therefrom, and means for operating each of said gates including an arm fulcrumed to the valve end and provided with a rack surface, a pinion carried at the fulcrum point of said gate intermeshing with said rack, a roller carried on a lateral extension of said arm, and a stationary cam groove in which said roller operates during the rotation of said body.

7. A cooker including a chamber provided with valve controlled inlet and outlet passages, a plurality of upwardly inclined endless conveyers including parallel spaced horizontally disposed receptacle carrying rods, rotatable disks positioned at the lower end of said conveyers between the upper and lower flights thereof, and provided with notched peripheries for receiving said receptacle carrying rods for imparting movement to said conveyers, a plate positioned beneath the respective flights of said conveyers, horizontally disposed rotatably mounted shafts for supporting said disks, a horizontally disposed rotatable shaft mounted between the lower end of each of said conveyers and in line with said first mentioned shafts, a receptacle directing gate on each of said shafts, means for rotating said shafts in unison, and means whereby certain of said shafts are capable of axial movement relative to the others for controlling the movement of said receptacles independently of said conveyers.

8. A cooker including a chamber provided with valve controlled receptacle inlet and outlet passages, a plurality of upwardly inclined endless conveyers each of a different length and positioned within said chamber, a plurality of rotatable horizontally disposed shafts extending transversely of said chamber, certain of said shafts disposed at the lower ends of said conveyers between the upper and lower flights thereof, and other of said shafts disposed between the lower ends of adjacent conveyers; means for horizontally rotating alternate shafts in opposite directions, a receptacle direction controlling gate carried by each shaft, and means for axially adjusting of said shafts relative to the others for controlling the directing of the receptacles relative to said conveyers.

9. A cooker including a cooking chamber, an endless conveyer therein, a pair of axially rotatable horizontally disposed receptacle directing gates within said chamber and each including a radially extended member curved in the direction of rotation, the ends of said members overlapping on the assuming thereof of a substantially horizontal position, said members adapted to engage a receptacle and to convey the same within the path of said conveyer, means for rotating said gates in opposite directions, and means for imparting an independent axial movement to one of said gates to cause the radial member associated therewith to assume a substantially horizontal position slightly in advance of or after its coöperating member thereby controlling the movement of the receptacles relative to said conveyer.

10. A cooker including a cooking chamber, a conveyer therein, a pair of rotatable receptacle directing gates within said chamber and each including a radially extended member, the ends of said members overlapping on the assuming thereof of a position in line with the axis of rotation of the opposing gate, said members adapted to engage a receptacle and to convey the same within the path of said conveyer, means for rotating said gates in opposite directions, and means for imparting an independent movement to one of said gates, to cause the radial member associated therewith to assume a position in line with the axis of rotation of the opposing gate slightly in advance of or after its coöperating member, thereby controlling the movement of the receptacles relative to said conveyer.

In testimony whereof I have signed my name to this specification in the presence of a subscribing witness.

AXEL JOHNSON.

Witness:
D. B. RICHARDS.